United States Patent [19]

Hansen, Jr. et al.

[11] Patent Number: 4,679,297
[45] Date of Patent: Jul. 14, 1987

[54] METHOD FOR CHANGING THE TOOLING IN A ROBOT-BASED SYSTEM AND SYSTEM UTILIZING SAME

[75] Inventors: Robert E. Hansen, Jr., New Baltimore; James R. Murray; Roberta L. Zald, both of Troy, all of Mich.

[73] Assignee: GMF Robotics Corporation, Troy, Mich.

[21] Appl. No.: 863,333

[22] Filed: May 15, 1986

[51] Int. Cl.⁴ ............................................ B23Q 3/155
[52] U.S. Cl. ...................................... 29/568; 414/226; 414/786; 901/7; 901/30; 901/31
[58] Field of Search ................... 29/568; 901/6, 7, 30, 901/31, 39, 40, 8; 82/2.5, 2.7; 414/222, 225, 226, 786

[56] References Cited

U.S. PATENT DOCUMENTS

| | | | |
|---|---|---|---|
| 4,046,263 | 9/1977 | Cwycyshyn | 901/30 X |
| 4,281,447 | 8/1981 | Miller et al. | 29/568 |
| 4,310,958 | 1/1982 | Balaud et al. | 29/26 A |
| 4,400,607 | 8/1983 | Wakou et al. | 29/568 X |
| 4,621,408 | 11/1986 | Gabrielli | 29/568 |
| 4,627,785 | 12/1986 | Monforte | 901/40 X |

Primary Examiner—Gil Weidenfeld
Assistant Examiner—Steven C. Bishop
Attorney, Agent, or Firm—Brooks & Kushman

[57] ABSTRACT

A method for changing the tooling in a robot-based material transfer system is disclosed as well as a system utilizing the method. The tooling is changed to accommodate the transfer of material such as automotive parts having different configurations within the system. Initially, end effectors of gantry robots and/or transfer beds of the system are placed in at least one container which is indexed through the work envelopes of the robots. Then, at least one specially designed container containing new tooling is indexed into the work envelopes. The robots are controlled to remove the new tooling from the containers and to place the new tooling in operative positions in the system. In the disclosed embodiment, one of the robots utilizes a special transfer bed gripper to replace the old transfer beds with new transfer beds. Preferably, an automatic guided vehicle system (AGVS) moves containers to and from loading and unloading stations in the material handling system.

20 Claims, 12 Drawing Figures

METHOD FOR CHANGING THE TOOLING IN A ROBOT-BASED SYSTEM AND SYSTEM UTILIZING SAME

TECHNICAL FIELD

This invention relates to method and system for changing the tooling in a robot-based system and, in particular, to the method and system for changing the tooling of a robot-based system to accommodate parts having different configurations.

BACKGROUND ART

The predominate approach today to introduce factory automated technology into manufacturing is to selectively apply automation and to create islands of automation. The phrase "islands of automation" has been used to describe the transition from conventional or mechanical manufacturing to the automatic factory. Interestingly, some appear to use the phrase as though it were a worthy end object. On the contrary, the creation of such islands can be a major impediment to achieving an integrated factory.

Manufacturing examples of islands of automation often include numerically controlled machine tools; robots for assembly, inspection, painting, and welding; lasers for cutting, welding and finishing; sensors for test and inspection; automated storage/retrieval systems for storing work-in-process, tooling and supplies; smart carts, monorails, and conveyors for moving material from work station to work station; automated assembly equipment and flexible machining systems. Such islands are often purchased one at a time and justified economically by cost reductions.

To integrate the islands of automation it is necessary to link several machines together as a unit. For example, a machine center with robots for parts loading and unloading can best be tied to visual inspection systems for quality. Computer numerical control machine tools can all be controlled by a computer that also schedules, dispatches, and collects data. Selecting which islands to link can be most efficiently pursued on the basis of cost, quality and cycle time benefits.

In some cases the islands of automation will be very small (e.g. an individual machine or work station). In other cases the islands might be department-sized.

From a systems viewpoint, islands of automation are not necessarily bad, so long as they are considered to be interim objectives in a phased implementation of an automated system. However, to obtain an integrated factory system, the islands of automation must be tied together or synchronized. Systems synchronization frequently occurs by way of a material-handling system; it physically builds bridges that join together the islands of automation.

Automated material handling has been called the backbone of the automated factory. Other than the computer itself, this function is considered by many automation specialists as the most important element in the entire scenario of automated manufacturing. It is the common link that binds together machines, workcells, and departments into a cohesive whole in the transformation of materials and components into finished products.

To date, the major application for industrial robots has been material handling. Included here are such tasks as machine loading and unloading; palletizing/depalletizing; stacking/unstacking; and general transfer of parts and materials—for example, between machines or between machines and conveyors.

Robots are often an essential ingredient in the implementation of Flexible Manufacturing Systems (FMS) and the automated factory. The automated factory also will include a variety of material transportation devices, ranging from driver-operated forklifts to sophisticated, computer-operated, real-time reporting with car-on-track systems and color graphic tracking. These material transport systems serve to integrate workcells into FMS installations and to tie such installations and other workcells together for total factory material transport control.

With all of their versatility, robots suffer from a limitation imposed by the relatively small size of their work envelope, requiring that part work fixtures and work-in-process be brought to the robot for processing. Complete integration of the robot into the flexible manufacturing system requires that parts and subassemblies be presented to the robot on an automated transport and interface system. For example, installation of a machine tool served by a robot without an automated transport system will result in an inefficient island of automation needing large stores of work-in-process inventory for support, which are necessary to compensate for the inefficiencies of manual and fork truck delivery.

Robots may load and unload workpieces, assemble them on the transport, inspect them in place or simply identify them. The kind of activity at the robot or machine and material transport system interface dictates the transport system design requirements. One of the design variables relating to the interface includes accuracy and repeatability of load positioning (in three planes). Also, care in orienting the workpiece when it is initially loaded onto the transport carrier will save time when the work is presented to the robot or the tool for processing. Proper orientation of the part permits automatic devices to find the part quickly without "looking" for it and wasting time each time it appears at the workstation.

Fixtures may be capable of holding different workpieces, reducing the investment required in tooling when processing more than one product or product style on the same system.

The transport system must be capable of working within the space limitations imposed by building and machinery configurations, yet must be capable of continuous operation with the loads applied by a combination of workpiece weight, fixture weight, and additional forces imposed by other equipment used in the process.

The system must also have the ability to provide queuing of parts at the workstation so that a continuous flow of work is maintained through the process. Automatic queuing of transport carriers should provide gentle accumulation without part or carrier damage.

Robots and the machine tools they serve usually make up a large part of the cost of implementing an automated factory. Part of the justification for the investment is obtained through the ability to increase the operating time of equipment within the plant. With FMS's, the objective is to have machine tools cutting metal for 80% of the time instead of the historic 30%. Therefore, it is important that the materials transport system serving the robots and machine tools be capable of quickly moving into position with parts for loading into the machine, then quickly moving out of the workstation and on to downstream stations. Prompt transporter movements between stations allow work-in-process inventory to be minimized. Batch sizes are smaller and work faster with only a minimum of queuing at each workstation.

Tool changing by robots as an alternative to dedicated, automatic tool changers is becoming attractive owing to flexibility and relative lower cost. A robot equipped with special grippers can handle a large variety of tools, and the tools can be shared quickly by several machines.

For example, a robot which is positioned on a riser may load and unload two identical vertical milling machines with one of many tools. All the tools are stored in a rack in front of the robot between the two milling machines. The parts being machined are brought to the milling machines on auto transfer devices. The entire operation is controlled by a host computer that directs the robot controller and signals it which part type is coming to the robot and which set of tools to select to load and unload into the milling heads.

In designing a transport system, a determination must be made of how the parts are to be presented to the robot and to the workstation, and whether special carrier-top pallet designs are required. It is sometimes possible to move the parts already held in the same fixture that will be utilized by the machine tools during machining. The transport carrier is designed to accommodate chuck-like fixtures which are transferred from the carrier by a robot mounted directly on the machine or turning center. Rapid exchange of parts facilitates the integration of tools and the transport system into a smoothly functioning FMS.

A link for tying together some of the independently automated manufacturing operations is the automatic guided vehicle system (AGVS). The AGVS is a relatively fast and reliable method for transporting materials, parts or equipment. Guide path flexibility and independent, distributed control make an AGVS an efficient means of horizontal transportation. As an alternative to traditional conveying methods, the AGVS provides manufacturing management with a centralized control capability over material movement. Information available from the AGVS also provides management with a production monitoring data base.

Robot installations for transporter interface can be grouped into three principal categories: (1) stationary robots, (2) moving robots (on the floor or overhead), and (3) robots integral with a machine. The moving robots subdivide into two types. First are stationary robots, mounted on a transporter to move between work positions to perform welding, inspection, and other tasks. The second type of moving robot is the gantry unit that can position workpieces weighing more than one ton above the workcells and transport system. The system only has to deliver and pick up somewhere under the span of gantry movement.

A gantry robot can be described as an overhead-mounted, rectilinear robot with a minimum of three degrees of freedom (DF) and normally not exceeding six DF. The robot is controlled by a multi-microprocessor controller allowing it to interact with a multitude of other devices.

Large work envelopes, heavy payloads, mobility, overhead mounting, and the capability and flexibility to do the work of several pedestal-mounted robots are some of the advantages of implementing a gantry robot versus a floor or pedestal-mounted robot.

Gantry robots have been around for many years in various forms, from refueling systems in the nuclear reactor cell to large material-handling systems in the mining industry. There are also pseudogantry robots which are composed of primarily a pedestal robot mounted in the inverted position and on slides, allowing it to traverse over the work area. Since gantry robots are somewhat unique, some terms are used that do not pertain to pedestal robots, as follows:

Superstructure: Also called the gantry support structure or box frame. This is the structure upon which the robot will be elevated from the floor. It is an integral and essential portion of a gantry robot system.

Runway: The longitudinal X axis of the gantry robot. It is normally the passive side rails of the superstructure.

Bridge: The transverse or Y axis of the gantry robot. The bridge is an active member of the robot riding on the runway rails and supporting the carriage.

Carriage: The support structure for the Z axis. Provides the Y axis motion on the bridge.

Telescoping tubes/masts: Depending on the robot this is the vertical or Z axis of the gantry robot. In the case of telescoping tubes, they come together, allowing for a lower ceiling. A sliding mast slides along its length up and down, requiring a ceiling height equal to its stroke above the superstructure.

There are two major designs of gantry-style robots, the four-poster and the cantilever. The four-poster gantry has a complete overhead structure which covers the entire work envelope. The robot is mounted much the same as an underslung bridge crane. The axes consist of an X, Y, and direct vertical Z in Cartesian coordinates with optional wrists that enable straightforward programming and control.

Some of the unique advantages of the four-poster gantry are: (1) the design can be very modular, allowing for a wide range of sizes in both the X and Y axes; (2) design modularity of supports can allow for heavy payloads; (3) a large work envelope can be provided at a very reasonable cost; and (4) the Cartesian coordinates allow for application of a variety of proven software schemes, including CNC-type controls.

The alternative gantry style is the cantilever type. The basic advantages of this type of robot include: (1) modularity of the X axis, allowing for very long travel; (2) the ability to apply a rotary waist, making both sides of the gantry available as separate work spaces; (3) a programmable structure overhead, allowing clearance to load and unload parts from above using a crane or forklift, for example; (4) open accessibility from all directions, allowing conveyors, pallets, or part feeding from any direction; (5) design rigidity, permitting extreme accuracy and reliability for light machining tasks or routing applications; and (6) cartesian coordinates and rigid design combination, providing for application of CNC-type controller with the inherent accuracy to permit off-line programming.

The gantry can be linked to advanced computer control because it offers simplicity of movement and high accuracy. With the system's off-line programming capability, a marriage can be made with CNC machine tools for automatic reprogramming, making small-batch automation economically feasible.

The cantilevered gantry can be used with direct numerical or hierarchical control. It can be coupled with communication and supervisory computers in FMS or complete factory automation systems. The gantry robot can also be fitted with vision and adaptive or advanced sensory interfaces to provide real-time path modifications.

Today's gantry robots have the capability of handling very heavy payloads. Heavier payloads sometimes require stronger end effectors. End effectors for gantry robots sometimes can become very complex, since they can perform more than one task. These end effectors can become very heavy, thereby reducing the effective payload.

End effectors used in material handling such as palletizing include all of the conventional styles—standard grippers, vacuum cups, electromagnets—and many special designs to accommodate unusual applicatoin requirements. Dual-purpose tooling is often used to pick up separators or trays, as well as the parts being moved through the system.

Vacuum-type grippers and electromagnetic grippers are advantageous, because they permit part acquisition from above rather than from the side. This avoids the clearance and spacing considerations that are often involved when using mechanical grippers.

However, the use of vacuum and electromagnetic grippers is not without its problems since cycle time is not just a function of robot speed and its accelerating-/decelerating characteristics. Cycle time is dependent on how fast the robot can move without losing control of the load. Horizontal shear forces must be considered in the application of these grippers. This often means that the robot is run at something less than its top speed.

United States patents disclose one or more tools which are adapted to be connected at the end of a robot arm. The tools are stored at a location adjacent the robot. Examples of such systems are disclosed in U.S. Pat. Nos. to Miller et al 4,281,447; Balaud et al 4,310,958; Hutchins et al 4,510,684, and Hennekes et al 4,512,709.

DISCLOSURE OF THE INVENTION

An object of the present invention is to provide a method and system for automatically changing the tooling in a robot-based system, wherein new tooling is automatically delivered into the work envelope of a robot which performs the automatic tool change.

Another object of the present invention is to provide a method and system for automatically changing the tooling in the robot-based material transfer system wherein new tooling is delivered in a predetermined position and/or orientation in a planned and orderly fashion so that the system can transfer different parts.

Yet still another object of the present invention is to provide a method and system for automatically changing the tooling in a robot-based system wherein work space is used efficiently through the use of specially adapted movable containers which not only receive and retain old tooling, but also deliver new tooling in a planned and orderly flow when a part change is desired.

In carrying out the above objects and other objects of the present invention a method is provided for automatically changing the tooling of a robot-based system, wherein the method includes the step of indexing a first container into the work envelope of a robot having a first end effector connected to the distal end of its arm. The method further includes the steps of conveying at least one fixture adapted to support a first part in a desired position and orientation into the work envelope, controlling the robot so that the robot removes the fixture from its operative position and places the fixture into the first container, moving the first container out of the envelope, indexing a second container having a second fixture adapted to support a second part in a desired position and orientation into the work envelope, controlling the robot so that the robot picks up and places the second fixture in its operative position in preparation for conveyance of the second part, and moving the second container out of the work envelope.

Further in carrying out the above objects and other objects of the present invention, the method includes the steps of indexing a first container into a work envelope of a robot having a first end effector connected to the distal end of its arm, controlling the robot so that the robot places the first end effector in the first container, moving the first container out of the work envelope, indexing a second container having a second end effector into the work envelope, controlling the robot so that the second end effector is connected to the distal end of the robot arm and moving the second container out of the work envelope.

Preferably, more than one robot is provided in the system. Also, a single container is provided for receiving and retaining the old end effectors and a single container is provided which contains the new end effectors for the robots.

Also, preferably, more than one old support fixture is received and retained within a container and more than one new support fixture is received and retained within a container.

Further in carrying out the above objects and other objects of the present invention, a system is provided for automatically changing the tooling of a robot-based system. The system comprises a robot having a first end effector connected to the distal end of its arm and capable of working within a work envelope. An indexing means is provided for serially indexing first and second containers into the work envelope and wherein the second container has a second end effector received and retained therein. A robot controller is provided for controlling the robot so that the robot first places a first end effector in the first container and then is controlled so that the second end effector is connected to the distal end of its arm. The control means is coupled to the indexing means and the controller for controlling the movement of the end effectors in the system.

Still further in carrying out the above objects and other objects of the present invention, the system includes a robot having an end effector connected to the distal end of its arm and capable of working within a work envelope. A conveying means is provided for conveying a first fixture adapted to support a first part in a desired position and orientation into the work envelope. Indexing means is provided for serially indexing the first and second containers into the work envelope. The second container has received and retained therein a second fixture adapted to support a second part in a desired position and orientation. A robot controller is provided for controlling the robot so that the robot initially picks up the first fixture from the conveyor means and places the first fixture into the first container and then picks up the second fixture from the second container and places the second fixture in operative position on the conveying means in preparation for conveyance of the second part. A control means is coupled to the conveying and indexing means and to the controller for controlling the flow of fixtures in the system.

Preferably, at least two robots are provided in the system wherein each of the robots is controlled by its own robot controller which, in turn, are controlled by the control means.

Also, preferably, each robot comprises a gantry robot and further includes means for mounting the gantry robots in an overhead fashion.

The advantages accruing to the use of such a method and system as described above are numerous. For example, new tooling is delivered to a robot in a controlled position and orientation after the old tooling has been changed, to thereby permit an automatic tool change in a planned and orderly fashion. Also, there is no need to store tools adjacent the robots and the work space. Consequently, there is more room for cross traffic or for additional machines, tools and/or materials. Also, in such a method and system the same tooling may be used for different locations at different times within, for example, a factory.

The objects, features and advantages of the present invention are readily apparent from the following detailed description of the best mode for carrying out the invention when taken in connection with the accompanying drawings.

BEST MODE FOR CARRYING OUT THE INVENTION

Referring to FIGS. 1 through 4, there is illustrated a material transfer system for transferring parts, such as automotive parts, into containers. Such parts may include stamped sheet metal parts such as roof panels, outer lids, panel compartments, outer lift windows, hatchbacks and the like. The present invention is concerned with the changing of tooling to accommodate different parts in such a robot-based system, and, consequently, the following description is provided to facilitate an understanding of the present invention.

Figure 3:
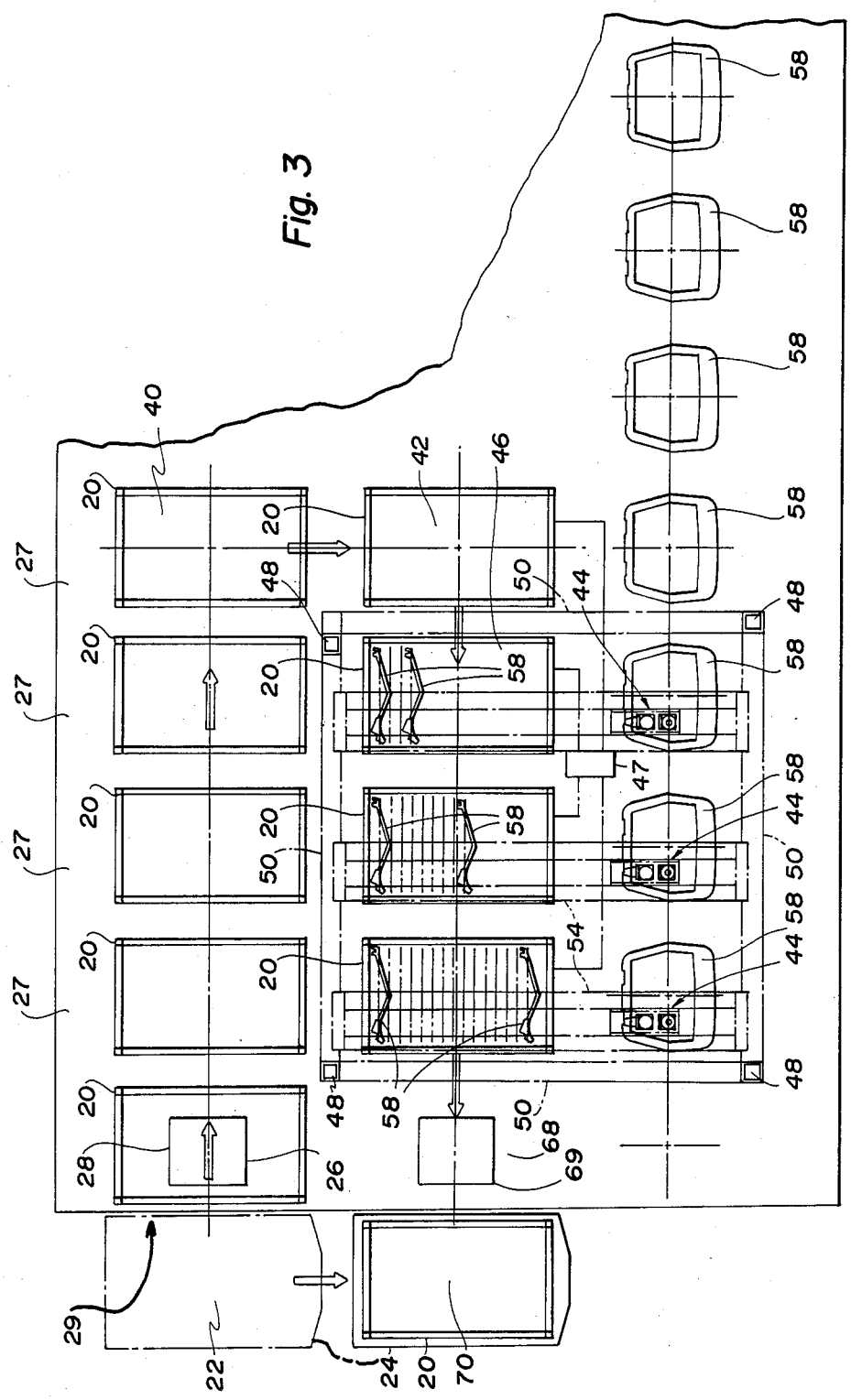
FIG. 3 is a top plan view, partially broken away, of the second system and which schematically illustrates the movement of containers and parts therein.

In general, empty containers, such as containers 20, are first carried to an unloading station 22 on automatic guided vehicles (AGV) 24 of an automatic guided vehicle system (AGVS) as shown in FIG. 3. However, it is to be understood that other methods and apparatus can be utilized to move the empty containers 20 to the unloading station 22, such as by conveyor or monorail, or even manually without departing from the spirit of the present invention.

From the unloading station 22 each empty container 20 is transferred off its respective AGV 24 by a conventional container transfer mechanism, generally indicated at 26 in FIG. 3. However, it is to be understood that the container 20 may be transferred in any well-known fashion to a position 28 from the unloading station 22. As illustrated in FIG. 3, after each of the containers 20 is transferred off its respective AGV 24, each container enters waiting positions 27 within a queue, generally indicated at 29, in which the containers 20 are temporarily stored.

Figure 2:
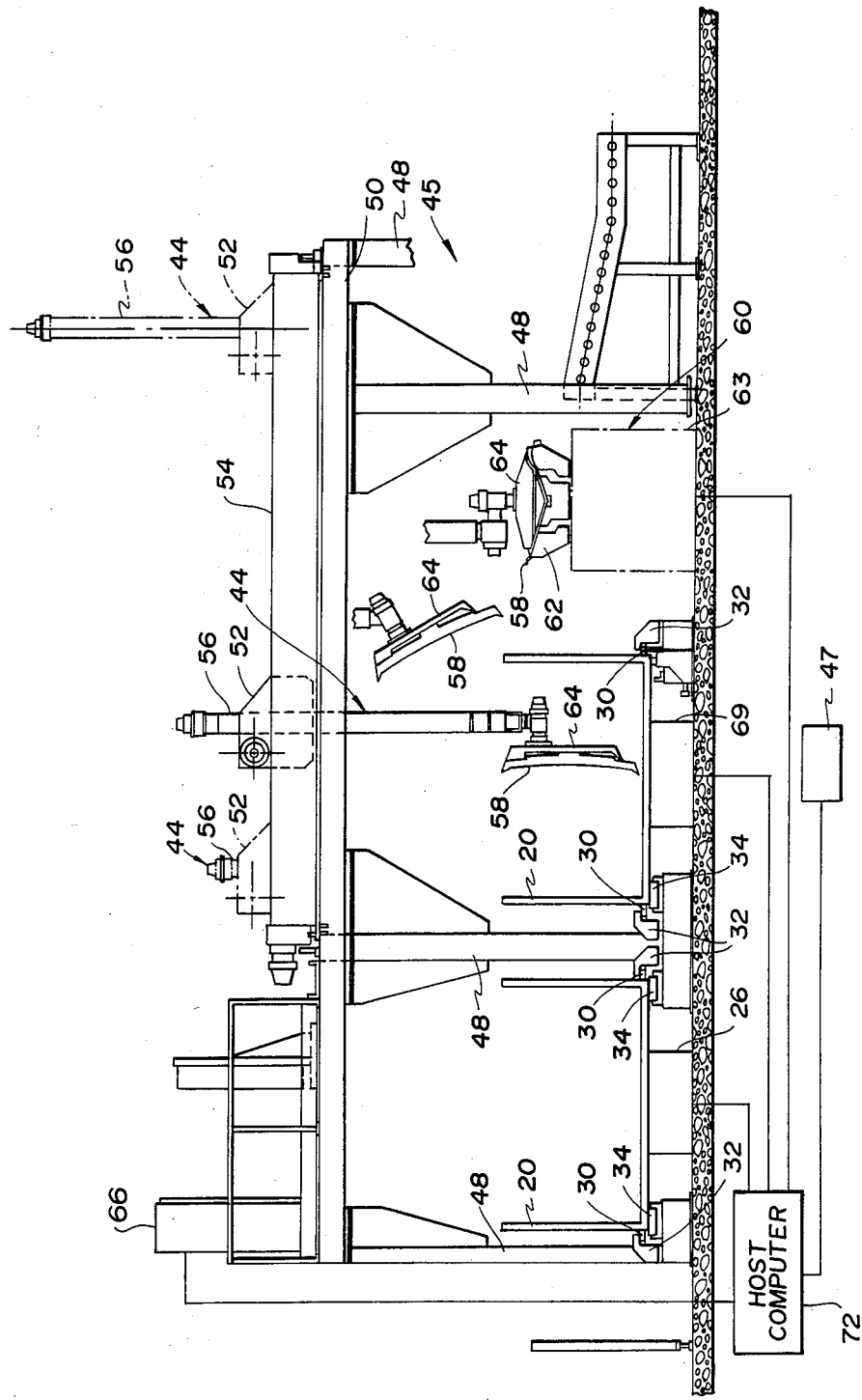
FIG. 2 is an end view, partially broken away and in cross section, of a second system similar to the first system but including only three robots and including a schematically illustrated host computer for controlling the various components of the system to thereby control the flow of containers and parts therein.

As best shown in FIG. 2, the queue 29 receives and retains the containers 20 as they move therein by means of locating rollers 30 which are rotatably supported between pairs of upwardly extending supports 32. Rotatably mounted support rollers 34 are also provided to permit conveyance of the containers 20 within the queue 29. The rollers 34 are driven by motors (not shown), to move the empty containers 20 within the queue 29. The containers 20 may be located within the queue by locating pins (not shown) or any other locating device at any of the particular stations illustrated in FIG. 3, so that the containers 20 do not strike one another.

Figure 1:
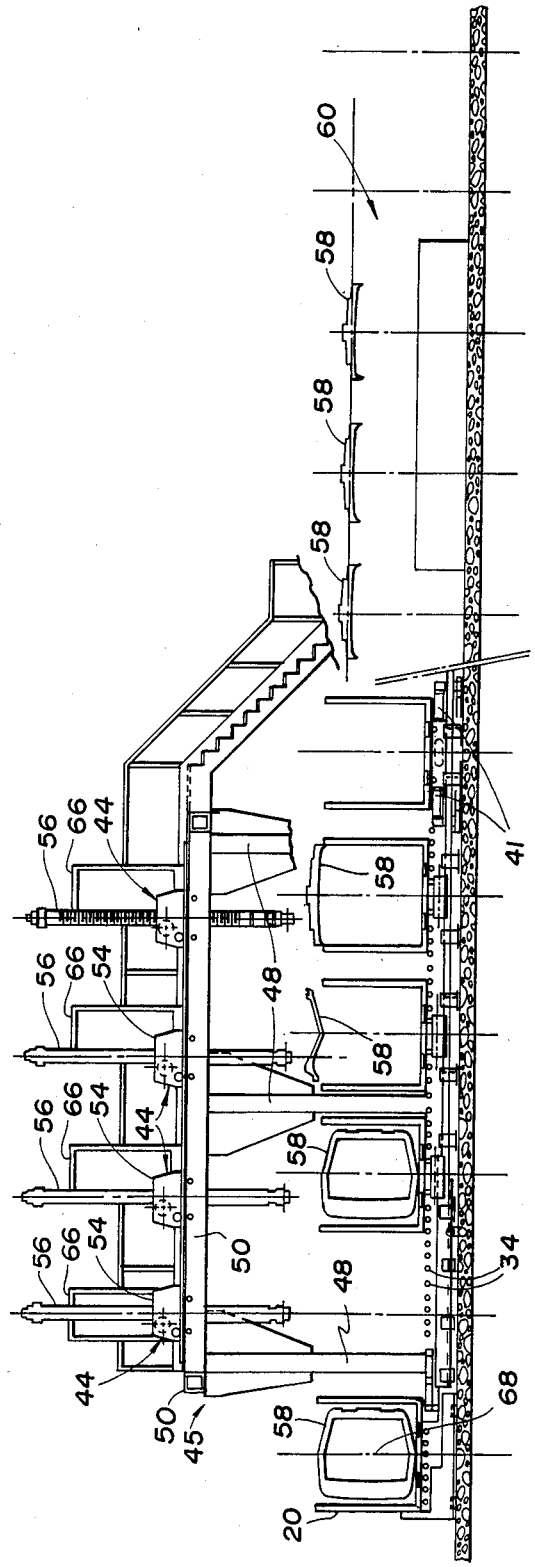
FIG. 1 is a side elevational view, partially broken away and in cross section, illustrating the method and system constructed in accordance with the present invention for automated handling of material such as automotive parts.

The containers 20 "turn a corner" at a station 40 in the queue 29 with a set of vertically adjustable rollers 41, as best shown in FIG. 1. The rollers 41 extend perpendicular to the rollers 34 and are vertically adjustable so that when a container 20 is at the station 40, the container 20 is lifted upwardly off the rollers 34 by movement of the rollers 41 upwardly. After movement of the container 20 from the station 40 to a station 42, the rollers 41 are lowered so that the container is again resting on the rollers 34.

From the station 42 the containers 20 are serially indexed into the work envelope of a first gantry robot, generally indicated at 44, to a station 46 by a conventional indexing means or indexing mechanism, schematically indicated at 47 in FIG. 3. The indexing mechanism 47 may include locking fingers (not shown) for locking the container 20 in the station 46 after the container has indexed thereto.

The first gantry robot 44, as well as the other gantry robots 44 of the system is supported by a superstructure, generally indicated at 45 in FIGS. 1 and 2. The superstructure 45 includes a plurality of vertical and interconnecting horizontal beams 48 and 50, respectively. Each gantry robot 44 includes a carriage 52 which is slidably mounted within its respective runway 54. None of the gantry robots 44 includes a transverse or Y axis, which is oftentimes termed a bridge, since each of the gantry robots 44 only moves in a longitudinal direction along its respective runway 54. Each of the gantry robots 44 also includes telescoping tubes or masts 56 which comprise a vertical or Z axis of the robot 44.

At the station 46, the container 20 is partially filled with automotive parts 58 which have been previously picked up by the first gantry robot 44 from a conveying means or mechanism, generally indicated at 60 in FIGS. 1 and 2. The conveying mechanism 60 preferably comprises a plurality of part support fixtures or transfer beds 62 which are connected in spaced relationship to an indexing conveyor or transfer rail 63. The upper surface of each of the transfer beds 62 is preferably formed to be complementary with the lower surface of each part 68 so that each part 58 is not only positioned properly, but also has a proper orientation for pickup by the gantry robots 44. Also preferably, the parts 58 are transferred by the transfer rail 63 through a combination of indexing steps, as is well known in the art.

Referring to FIG. 2, there is illustrated some of the various movements taken by a gantry robot 44 and its associated gripper 64 in picking up and placing a part 58 in a container 20. The gripper 64, which preferably comprises a vacuum gripper, has a lower surface which is also complementarily shaped to the upper surface of each of the parts 58.

Initially, after the gripper 64 has been positioned above the part 58 to be picked up, the robot 44 is controlled in a conventional fashion by its respective robot controller 66 to move downwardly along its Z axis to a position immediately above the part 58. Then the robot 44 is controlled so that vacuum pressure is provided at the gripper 64 to lift the part 58 from its transfer bed 62. Thereafter, the robot 44 moves through a lift stroke along its Z axis. The robot 44 is then controlled to rotate the part 58 and move the part 58 longitudinally towards the container 20. Thereafter, the robot 44 moves the part 58 through a loading downstroke. The air vacuum is then removed from the gripper 64 and the robot 44 reverses its prior movements to move to a position again above a part 58 on its transfer bed 62 which has indexed during loading of the prior part.

Second, third and any fourth gantry robots 44 are operative to load parts 58 only when there is a partially loaded container 20 within its work envelope to place parts 58 in predetermined positions within each of the containers 20 therein as illustrated in FIG. 3. Obviously, the transfer rail 63 synchronously indexes the beds 62 through the work envelopes of the robots 44 so that after part loading each of the robots 44 has a new part 58 within its work envelope to thereby continue part loading on an uninterrupted basis.

After each container 20 is fully loaded by the last gantry robot 44, the container 20 is indexed out of the last work envelope to a station 68 as illustrated in FIG. 1. From the station 68 it is loaded onto an AGV 24 by a second conventional transfer mechanism 69 at a loading station 70 immediately adjacent the station 68 through a sequence of steps opposite the sequence of steps employed in transferring the empty container from the unloading station 22 to the station 28.

A control means or a programmed host computer, schematically illustrated at 72 in FIG. 2, is electrically coupled to each of the robot controllers 66, the first and second transfer mechanism 26 and 69, the transfer rail 63 and the indexing mechanism 47 in order to synchronize motion of the containers 20, the transfer beds 60, the robots 44 and the containers 20. Also, the host computer 72 is typically an integral part of the AGVS of which the AGV 24 is a part.

Figure 4:
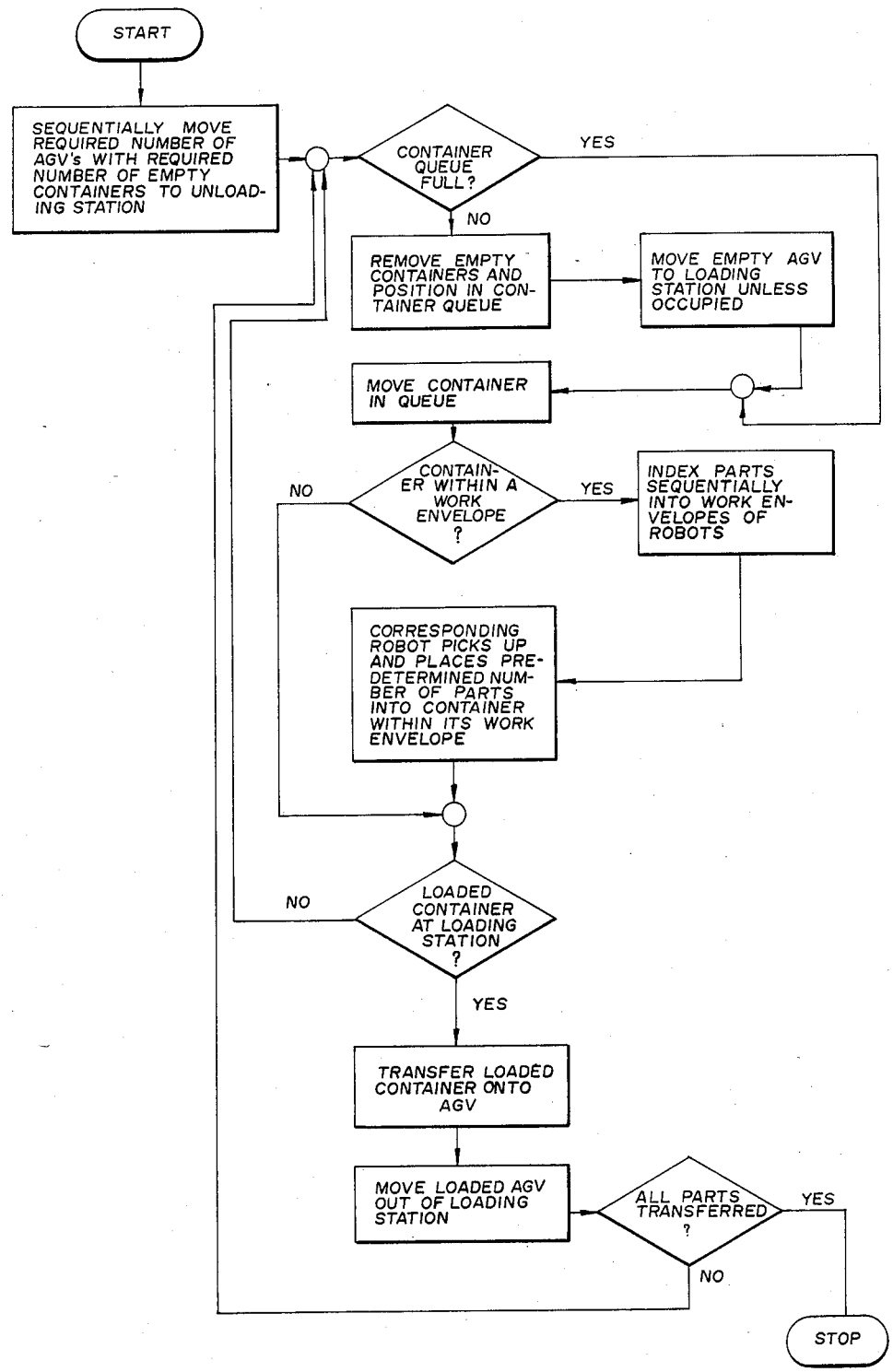
FIG. 4 is a flow chart, illustrating the various steps taken in performing the method of the present invention.

Referring now to FIG. 4, there is illustrated in block diagram from the various steps in the method of the pesent invention. The flow chart illustrated in FIG. 4 may be utilized in preparing a computer program utilized in controlling the motion of parts, containers and robots in the system.

Figure 5:
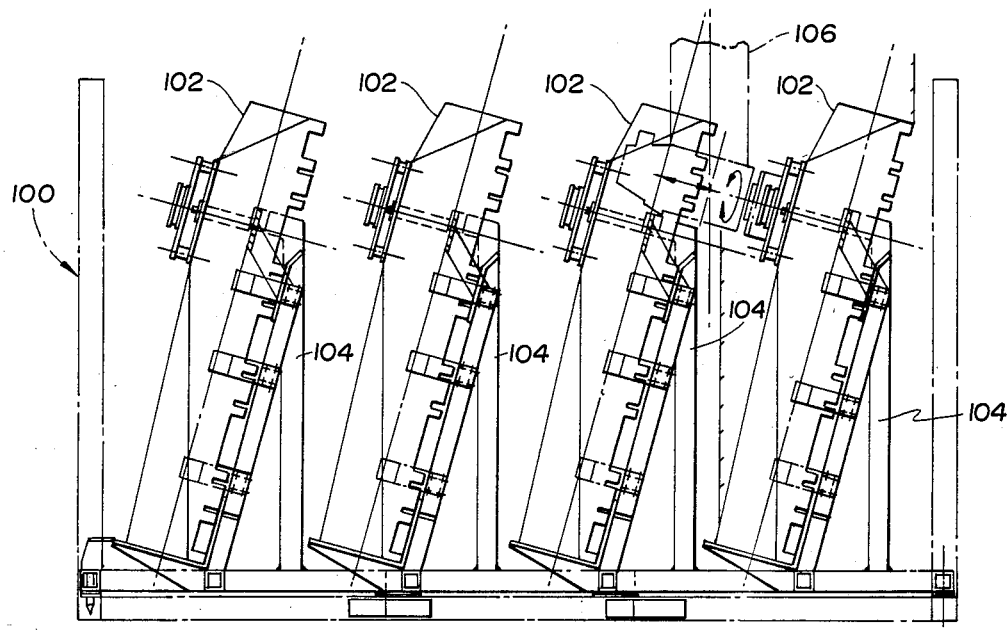
FIG. 5 is a side elevational view of four robot end effectors contained within a specially designed container which together with a portion of a robot, are shown in phantom.
Figure 6:
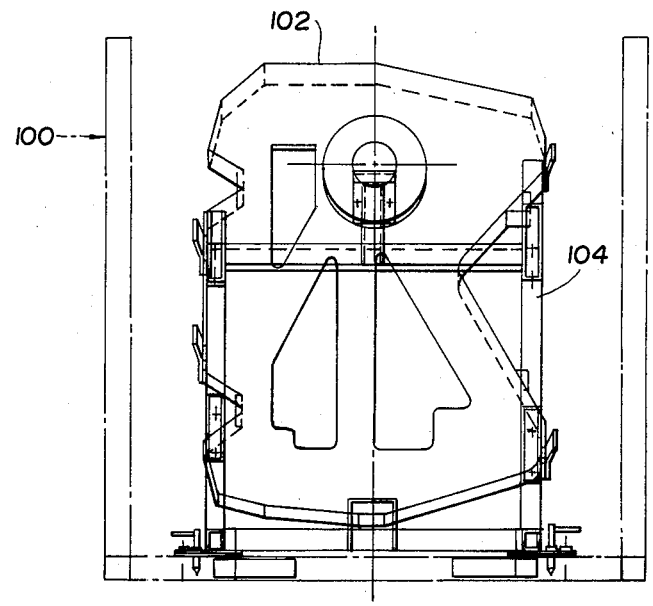
FIG. 6 is an end view of the filled container of FIG. 5.

Referring now to FIGS. 5 and 6, there is illustrated a specialized container, generally indicated in phantom at 100, for receiving and retaining four new end effectors 102 of the robots 44. The end effectors 102 may, for example, be used to replace the grippers 64. As is well known in the art, each of the grippers 102 may be operatively connected to the distal end of its respective robot arm, as is indicated in phantom at 106, by combined rotary and perpendicular movements relative to the gripper 102 as is schematically shown in FIG. 5.

Each of the end effectors 102 preferably comprises a vacuum gripper. The end effectors 102 are supported within the container 100 by fixtures 104. The undersurface of each of the end effectors 102 is complementarily formed to the top surface of the particular automotive part which it is designed to pick up and place into its respective parts container 20.

Figure 7:
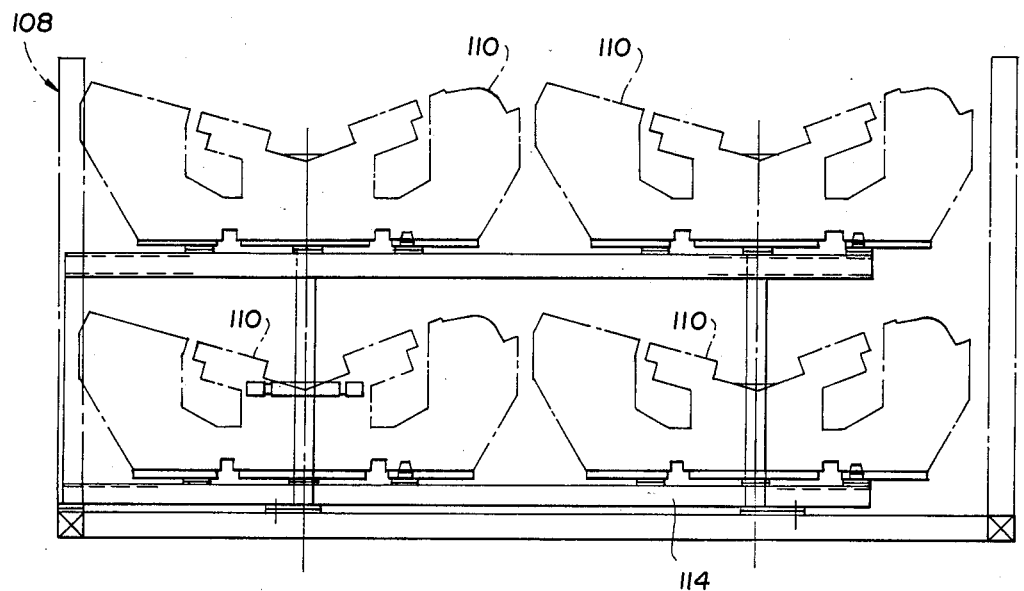
FIG. 7 is a side elevational view of four support fixtures or transfer beds, in phantom, contained within a specially designed container.
Figure 8:
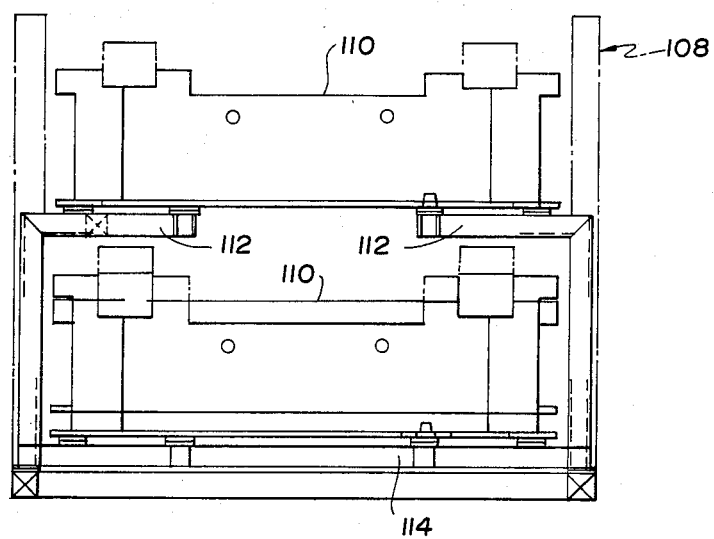
FIG. 8 is an end view of the filled container of FIG. 7.

Referring now to FIGS. 7 and 8, there is illustrated a specially designed container, generally indicated in phantom at 108, which is specially adapted to hold four new support fixtures or transfer beds 110, also indicated in phantom at 110. The transfer beds 110 may, for example, be used to replace the old transfer beds 62. The upper transfer beds are supported on a pair of L-shaped brackets 112. The brackets 112 are spaced to permit lower transfer beds 110 to be placed on their respective lower shelf 114 by, for example, one of the robots 44. The movement of the containers 100 and 108 can be controlled in the same fashion as the movement of the containers 20.

Figure 9:
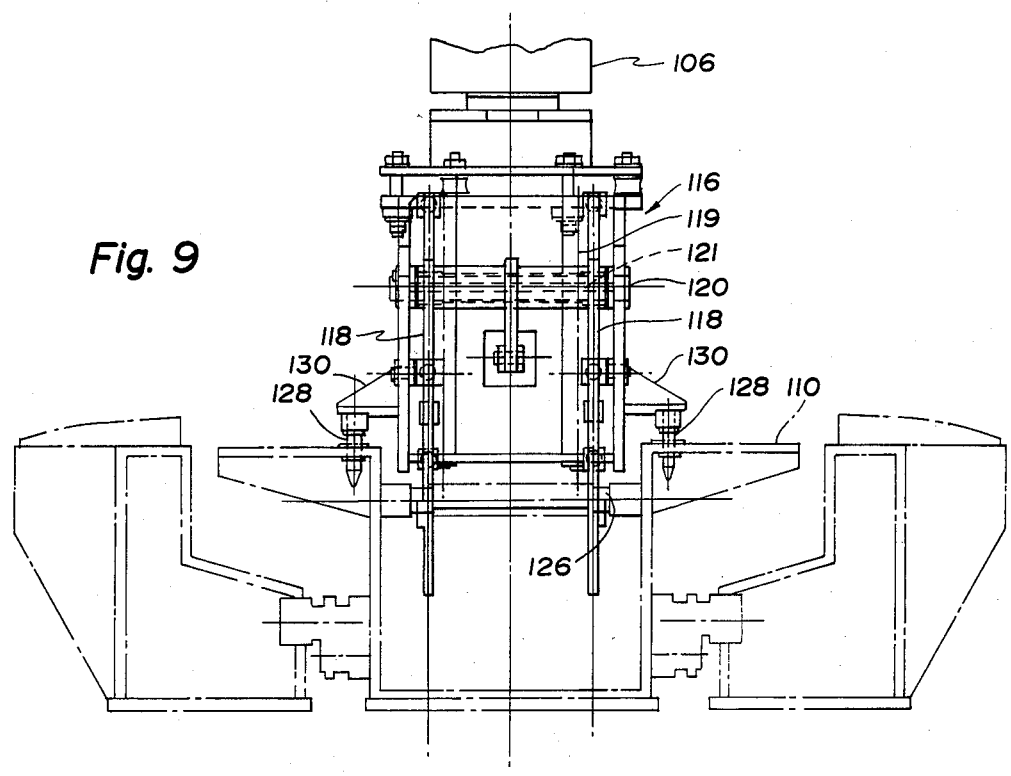
FIG. 9 is a side elevational view, partially broken away, of a transfer bed gripper mounted on the distal end of a robot in operative position relative to a transfer bed shown in phantom.
Figure 10:
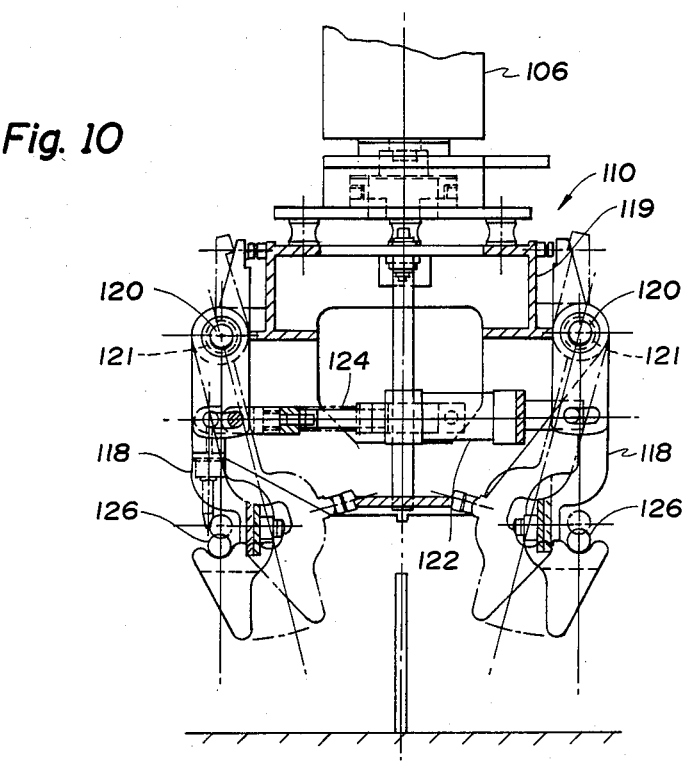
FIG. 10 is a sectional end view of the transfer bed gripper shown in two operative positions, the second operative position being shown in phantom.

Referring now to FIGS. 9 and 10, there is illustrated a transfer bed gripper, generally indicated at 116, which is adapted to be releasably mounted at the distal end of the robot arm 106, similarly, through a combination of rotary and perpendicular movements. The bed gripper 116 includes two pairs of locking arms 118 which are pivotally mounted to the frame 119 of the gripper 116 at points 120. Each pair of locking arms are pivotally interconnected by a pivot rod 121. The locking means 118 move between locked and unlocked positions relative to support rods 126 of the transfer bed 110 as shown in FIG. 10 upon actuation of an air cylinder 122 which is mounted on the frame 119. The air cylinder 122 operates against a compression spring 124 so that upon retraction of the air cylinder 122, the locking arms 118 are disengaged from the support rods 126 which interconnect the different parts of the support bed 110. Upon extension of the air cylinder 122, the arms 118 engage the support rods 126 so that upon vertical movement of the distal end of the robot arm 106 the transfer bed 110 is transferred from the transfer rail 63.

The bed gripper 116 includes locating pins 128 which are mounted on support brackets 130 supported on opposite sides of the frame 119. The transfer beds 110 include complementarily formed apertures to receive the pins 128 to ensure proper positioning of the bed gripper 116 with respect to the transfer bed 110.

Figure 11A:
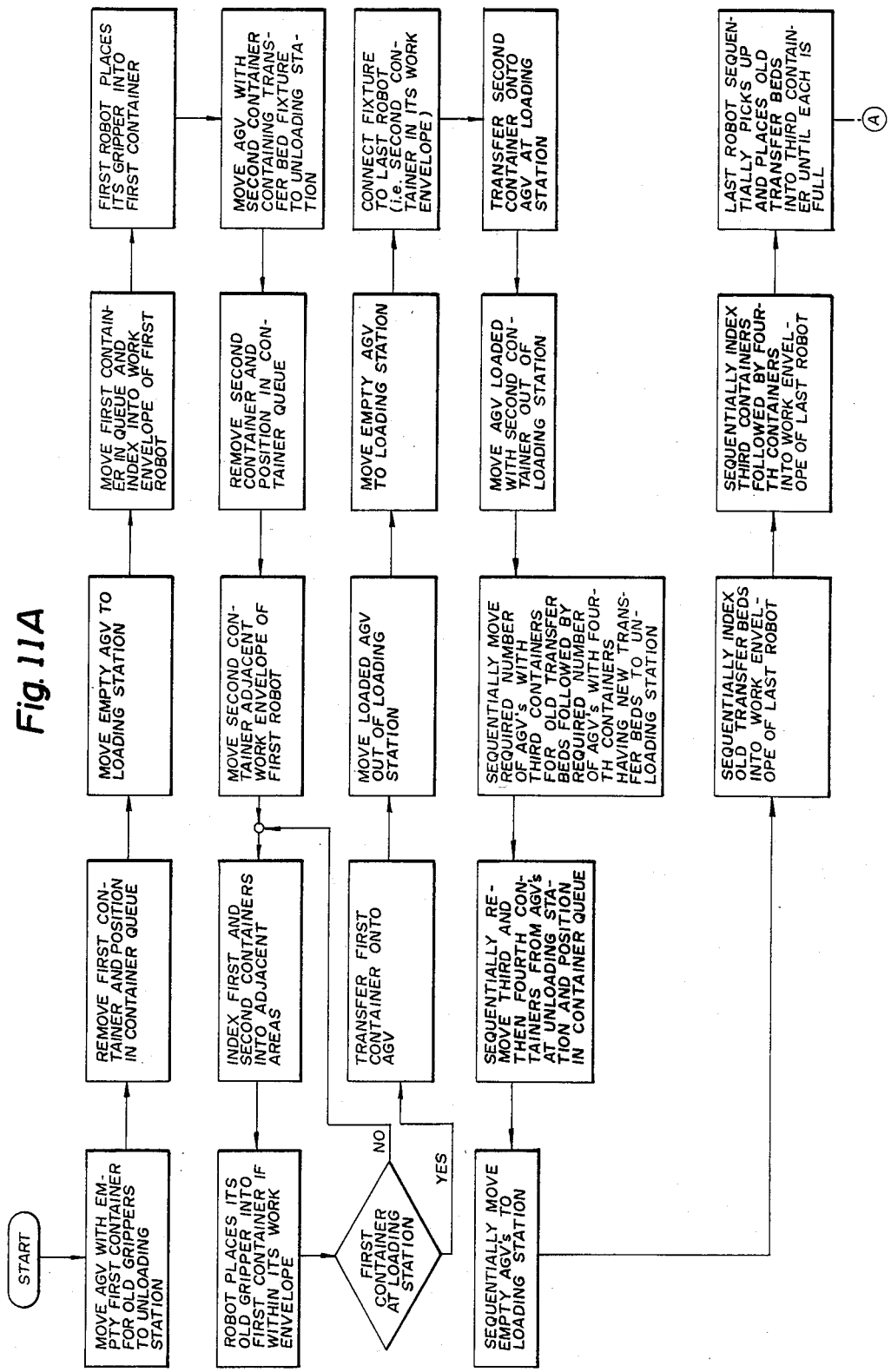
FIGS. 11A and 11B is a flow chart which schematically illustrates the various steps taken by the various components of the system to accomplish the tooling changeover.
Figure 11B:
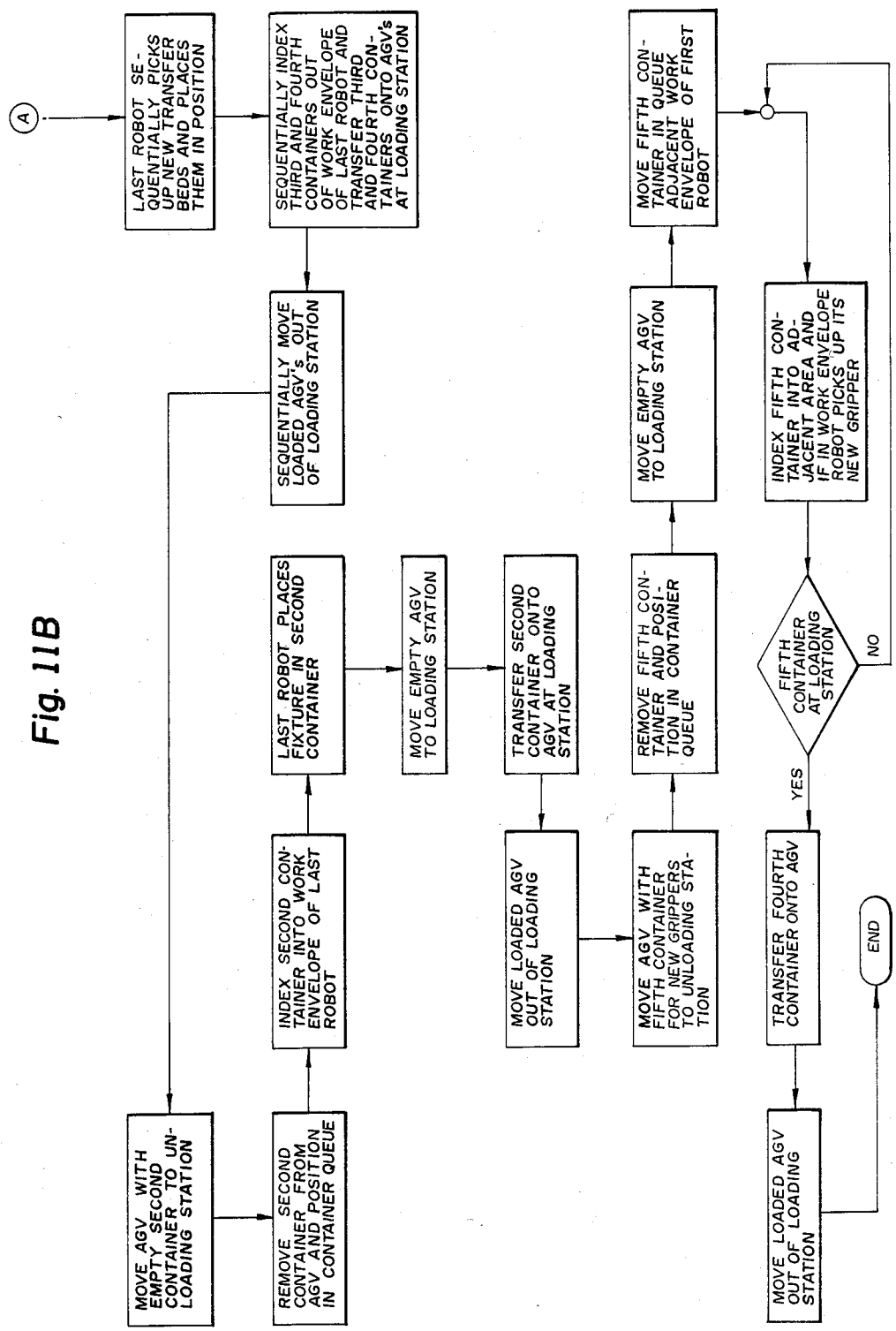

Referring now to FIG. 11, there is illustrated in flow chart form the various steps performed by the various components of the material transfer system to change the grippers of each of the gantry robots 44 and/or the transfer beds, which are specially adapted for a particular stamped automotive part. It is believed that a simple reading of the flow chart is sufficient to enable one of ordinary skill in the art to program the host cmputer 72 which, in turn, controls the various sequence of movements required to replace old end effectors with new end effectors and also to replace old transfer beds with new transfer beds. This retooling is performed, for example, when it is desired to place parts having a different configuration into containers such as the containers 20. However, it is to be understood that other specially designed containers may be employed instead of the containers 20 if the new parts are shaped (and/or sized) substantially different from the parts 58.

It is also to be understood that instead of utilizing a specially constructed bed gripper, such as the bed gripper 116, it is possible to design a single end effector which not only is useful in replacing old transfer beds with new transfer beds, but also may be utilized to pick up and place the parts on which the transfer bed is supported in containers. In other words, such a specially designed gripper would be capable of picking up and placing not only support fixtures but also the parts which the support fixtures support.

The invention has been described in an illustrative manner and it is to be understood that the terminology which has been used in intended to be in the nature of words of description rather than of limitation.

Many modifications and variations of the present invention are possible in light of the above teachings. It is, therefore, to be understood that within the scope of the appended claims the invention may be practiced otherwise than as specifically described.

What is claimed is:

1. A method for automatically changing tooling of a robot-based system, the method comprising:
   indexing a first container into a work envelope of a robot having a first end effector connected to a distal end of an arm;
   conveying at least one fixture adapted to support a first part in a desired position and orientation into the work envelope;
   controlling the robot so that the robot removes the fixture from an operative position and places the fixture in the first container;
   moving the first container out of the work envelope;
   indexing a second container having a second fixture adapted to support a second part in a desired position and orientation into the work envelope;
   controlling the robot so that the robot picks up and places the second fixture in an operative position in preparation for conveyance of the second part; and
   moving the second container out of the work envelope.

2. The method of claim 1 wherein the first end effector comprises a gripper and wherein the method further comprises:
   indexing a third container into the work envelope;
   controlling the robot so that the robot places the first end effector in the third container;
   moving the third container out of the work envelope;
   indexing a fourth container having a second end effector into the work envelope; and
   controlling the robot so that the second end effector is connected to the distal end of the robot arm.

3. A method for automatically changing tooling of a robot-based system, the method comprising:
   indexing a first container into a work envelope of a robot having a first end effector connected to a distal end of an arm;
   controlling the robot so that the robot places the first end effector in the first container;
   moving the first container out of the work envelope;
   indexing a second container having a second end effector into the work envelope;
   controlling the robot so that the second end effector is connected to the distal end of the robot arm; and
   moving the second container out of the work envelope.

4. The method of claim 3 wherein the first and second end effectors comprise grippers adapted to pick up and place respective first and second parts in part containers, wherein the method further comprises:
   indexing a third container into the work envelope;
   conveying at least one fixture adapted to support the first part in a desired position and orientation into the work envelope;
   controlling the robot so that the robot picks up and places the fixture in the third container; and
   moving the third container out of the work envelope.

5. The method of claim 4 further comprising the steps of:
   indexing a fourth container having a second fixture adapted to support the second part in a desired position and orientation into the work envelope; and
   controlling the robot so that the robot picks up and places the second fixture in an operative position in preparation for conveyance of the second part.

6. The method of claim 1 or claim 2 or claim 3 or claim 4 or claim 5 further comprising the step of queuing the containers.

7. A method for automatically changing tooling of a robot-based system, the method comprising:
   indexing a first container into a work envelope of a first robot having a first end effector connected to a distal end of an arm;
   controlling the first robot so that the first robot places the first end effector in a first predetermined position in the first container;
   indexing the first container out of the work envelope of the first robot and into a work envelope of a second robot having a second end effector connected to a distal end of an arm;
   controlling the second robot so that the second robot places the second end effector in a second predetermined position in the first container;
   serially indexing a second container having third and fourth end effectors into the work envelopes of the first and second robots; and
   serially controlling the robots so that the third and fourth end effectors are connected to the distal ends of the first and second robots, respectively.

8. A method for automatically changing tooling of a robot-based system wherein the method comprises:
   serially indexing a first container into work envelopes of first and second robots, each of the robots having an end effector connected to a distal end of an arm;
   conveying first and second fixtures adapted to support respective parts in a desired position and orientation into the work envelope of at least one of the first and second robots, respectively;
   controlling the one robot so that the one robot picks up and places the fixtures in respective first and second predetermined positions in the first container;

moving the first container out of the work envelope of the one robot;

indexing a second container having third and fourth fixtures each adapted to support a second part in a desired position and orientation into the work envelope of the one robot;

controlling the one robot so that the one robot serially picks up and places the third and fourth fixtures in operative position in preparation for conveyance of the second parts; and moving the second container out of the work envelope of the one robot.

9. The method of claim 8 wherein the method further comprises:

indexing a third container into the work envelope of the first robot;

controlling the first robot so that the first robot places its end effector in a first predetermined position in the third container;

indexing the third container out of the work envelope of the first robot and into the work envelope of the second robot;

controlling the second robot so that the second robot places its end effector in a second predetermined position in the third container;

moving the third container out of the work envelope of the second robot;

serially indexing a fourth container having third and fourth end effectors into the work envelopes of the first and second robots; and serially controlling the robots so that the third and fourth end effectors are connected to the distal ends of the first and second robots, respectively.

10. The method of claim 8 or claim 9 or claim 7 further comprising the step of queuing the containers.

11. A system for automatically changing tooling of a robot-based system, the system comprising:

a robot having a first end effector connected to a distal end of an arm and capable of working within a work envelope;

indexing means for serially indexing first and second containers into the work envelope, the second container having a second end effector received and retained therein;

a robot controller for controlling the robot so that the robot first places the first end effector in the first container and then so that the second end effector is connected to the distal end of the arm; and control means coupled to said indexing means and said controller for controlling the movement of end effectors in the system.

12. A system for automatically changing tooling of a robot-based system, the system comprising:

a robot having an end effector connected to a distal end of an arm and capable of working within a work envelope;

conveying means for conveying a first fixture adapted to support a first part in a desired position and orientation into the work envelope;

indexing means for serially indexing first and second containers into the work envelope, the second container having a second fixture adapted to support a second part in a desired position and orientation received and retained therein;

a robot controller for controlling the robot so that the robot first picks up the first fixture from the conveying means and places the first fixture in the first container and then picks up the second fixture from the second container and places the second fixture in operative position on said conveying means in preparation for conveyance of the second part; and control means coupled to said conveying and indexing means and to said controller for controlling flow of the fixtures in the system.

13. A system for automatically changing tooling of a robot-based system, the system comprising:

first and second robots, each of said robots having a first end effector connected to a distal end of an arm and capable of working within a respective work envelope;

indexing means for serially indexing first and second containers into the work envelope of the first robot and subsequently serially indexing the containers into the work envelope of the second robot, the second container having a pair of second end effectors disposed in predetermined positions therein;

first and second robot controllers for controlling said first and second robots, respectively, so that the first and second robots first place their respective first end effectors in respective predetermined positions in the first container and so that the pair of second end effectors are then connected to the distal ends of their respective robot arms; and control means coupled to the indexing means and to the controllers for controlling movement of the end effectors in the system.

14. A system for automatically changing tooling of a robot-based system, the system comprising:

first and second robots, each of said robots having an end effector and capable of working within a respective work envelope;

indexing means for serially indexing first and second containers into the work envelope of the first robot and subsequently serially indexing the containers into the work envelope of the second robot, the second container having a pair of first fixtures adapted to support first parts in desired positions and orientations in predetermined positions therein;

conveying means for serially conveying a pair of second fixtures adapted to support second parts in desired positions and orientations into the work envelopes of the first and second robots;

first and second robot controllers for controlling first and second robots respectively, so that at least one of the first and second robots picks up and places the pair of second fixtures in predetermined positions in the first container and picks up and places the pair of first fixtures from the second container in respective operative positions on said conveying means in preparation for conveying the first parts thereon; and control means coupled to said indexing and conveying means and to said controllers for controlling flow of the fixtures in the system.

15. The system as claimed in claim 14 or claim 13 further comprising queuing means for queuing the containers in a queue, said indexing means indexing the containers in the queue.

16. The system as claimed in claim 12 or claim 13 wherein each of said robots comprises a gantry robot and wherein said system further includes means for mounting said gantry robots in an overhead fashion.

17. The system as claimed in claim 12 or claim 13 wherein each of said end effectors comprises a vacuum gripper removably connected to the distal end of its robot arm.

18. The system as claimed in claim 11, claim 12, claim 13 or claim 14 wherein said control means includes a host computer for coordinating operation of said indexing means and said robot controllers.

19. The system as claimed in claim 11 or claim 13 wherein each of the fixtures includes a transfer bed for supporting a part thereon in a fixed position.

20. The system as claimed in claim 15 further comprising a plurality of automatic guided vehicles coupled to said control means for providing said containers to said queuing means and for receiving said containers therefrom.

* * * * *